United States Patent

Beery

[15] 3,635,465
[45] Jan. 18, 1972

[54] DOCUMENT SEPARATOR CONTROL SYSTEM

[72] Inventor: Jack Beery, Farmington, Mich.
[73] Assignee: Burroughs Corporation, Detroit, Mich.
[22] Filed: Oct. 19, 1970
[21] Appl. No.: 81,808

[52] U.S. Cl. ............................................................ 271/41
[51] Int. Cl. .......................................................... B65h 3/06
[58] Field of Search ................................ 271/41, 40, 38, 36

[56] References Cited

UNITED STATES PATENTS 2,257,843  10/1941  Payne ...................................... 271/41
3,424,452  1/1969   Jones ................................... 271/41 X

*Primary Examiner*—Joseph Wegbreit
*Attorney*—Kenneth L. Miller and Edwin W. Uren

[57] ABSTRACT

There is disclosed herein a portion of a document transport system including a document feeding unit and a document separator unit. The document feeding unit dispenses a plurality of overlapping documents into a guideway upstream from the separator unit. The separator unit functions to restrict the travel of all overlapping documents allowing only the single front document to continue along the document guideway and to space the documents entering the document guideway. A control system for the document separator unit functions to maintain the forces between the documents and the separator unit to restrict the travel of the overlapping documents. In the preferred embodiment, the separator unit is an endless belt which is moving in a direction opposite to the normal direction of document travel. The control system functions according to the basic frictional equation, $F=fN$, to vary the normal force, $N$, thereby maintaining the frictional force, $F$, substantially constant.

11 Claims, 5 Drawing Figures

DOCUMENT SEPARATOR CONTROL SYSTEM

BACKGROUND OF THE INVENTION

1. Field of Invention

This invention relates to the field of sheet or document feeding and in particular to the separation of documents prior to or at the beginning of a document transport system.

2. Prior Art

In the field of document or sheet feeding there have been many different mechanisms and devices designed to restrict the simultaneous feeding or conveying of two or more documents. Except for the basic fixed throat size which may be found in document transport system, most of these mechanisms and devices can be classified as counterrotation devices. These counterrotation devices rotate or move on the surface of a document in a direction opposite to the travel of the document. If there are overlapping documents passing along the guideways containing these counterrotational devices, these devices will act on the overlapping document restricting their movement and allowing the front document to continue along the guideway. It is necessary, therefore, that these counterrotation devices be pressure loaded against a document drive member in order to move the front document along the guideway. Two typical means of pressure loading these devices are spring biasing and the fixing of the placement of these devices relative to the drive wheels. The disadvantages of both of these devices are quickly made apparent during the life of the document transport system. The springs must be designed using worse case conditions and taking into account the document transport useful life between periods of adjustments. This, therefore, requires periodic maintenance and adjustment in order to maintain the document separating function of the system. In both of these systems, the constant force between the separator element and the drive wheel results in excessive wear between the two units in the absence of a document. Another disadvantage of these preloaded systems is the initial load placed upon the prime movers or motors requiring a high starting torque motor.

It is a principal object of the present invention to maintain the frictional forces between the separator members and the drive members in response to variations in the coefficient of friction of the several members including the documents.

It is another object of the present invention to reduce the starting torque requirements on the prime movers when the document transport systems are initially turned on.

SUMMARY OF THE INVENTION

In a document transport system for transporting a plurality of documents on edge between a hopper and one or more storage pockets, a control system for maintaining a uniform drive force on a multiple-document separator member. The hopper, positioned adjacent to the inlet of the document transport system, stores and dispenses a plurality of overlapping documents in a predetermined order. The documents are dispensed from the hopper into a guideway for guiding the documents along a path of travel. Positioned adjacent to and extending into the guideway is a document drive means. The drive means is in operative contact with the broadside surface of the front document of the document being fed and moves that document along the guideway towards the storage pockets. Also extending into the guideway diametrically opposite and operatively coupled to the document drive means, is a separator member. The separator member applies a force normal to the broadside surface of the document overlapping the front document or if not overlapping document is present, it applies force to the front document resulting in a frictional force in a direction opposite to the movement of the front document. This frictional force, applied by the separator member to the broadside of the overlapping document is greater than the frictional forces between overlapping documents thereby causing the overlapping documents to be separated one from the other. A velocity indicator means is operatively coupled to the document drive means and is responsive to a velocity change in the drive means. Any velocity change is indicated by an electrical signal which is generated from the indicator. This signal is electrically coupled to a pressure actuator to maintain the normal force applied to the broadside of the overlapping documents. As the velocity of the drive means decreases, the force being applied by the separator member also decreases so as to maintain the frictional force between the overlapping documents within a predetermined constant range.

The separator member in the preferred embodiment is an endless flexible belt which is driven by a separately energized low-speed high-torque prime mover in a direction opposite to the direction of travel of the document. The linear speed of the belt is substantially slower than the linear speed imparted to the document drive means.

DETAILED DESCRIPTION

Figure 1:
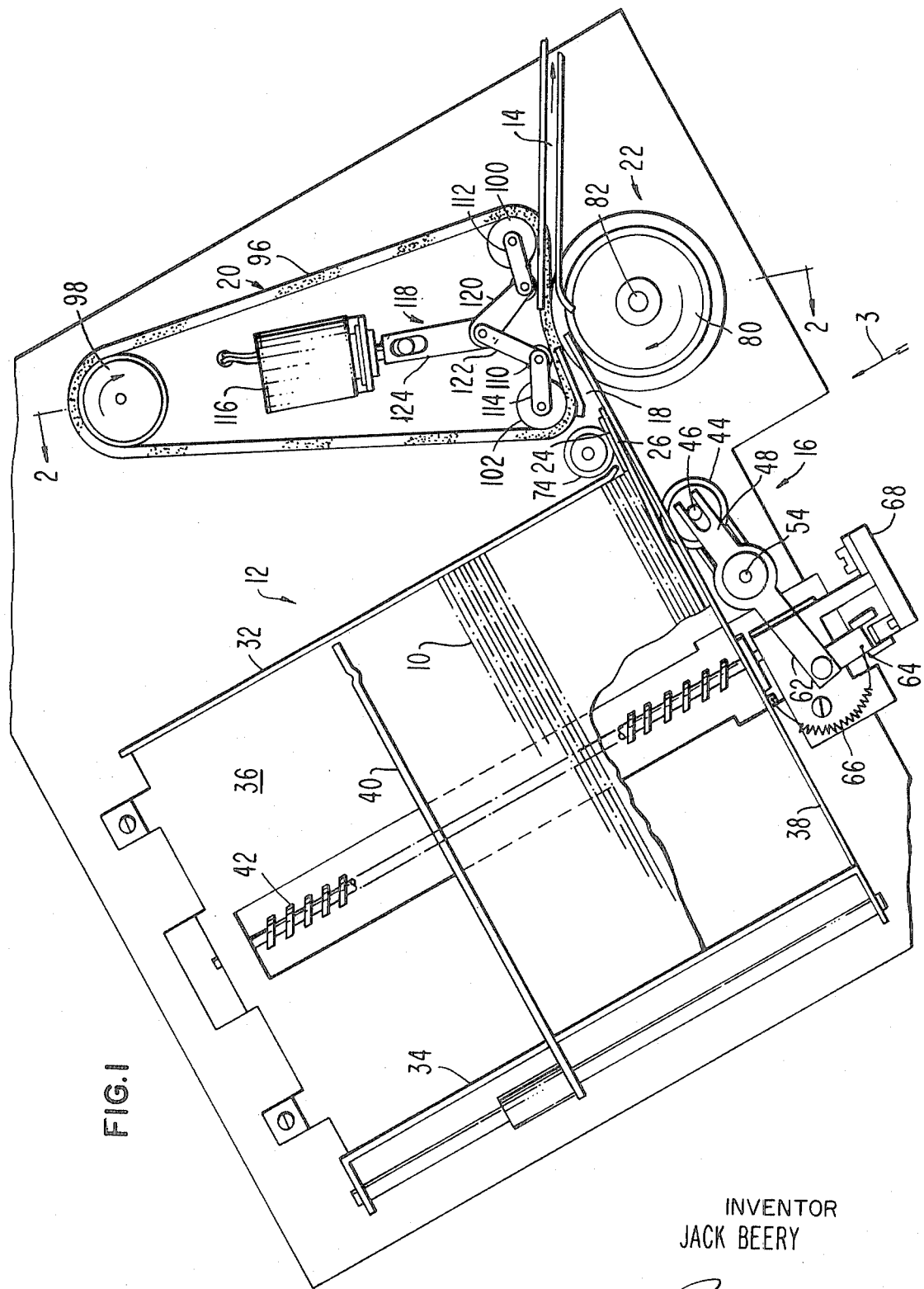
FIG. 1 is a plan view of a separator unit and a supply hopper.
Figure 2:
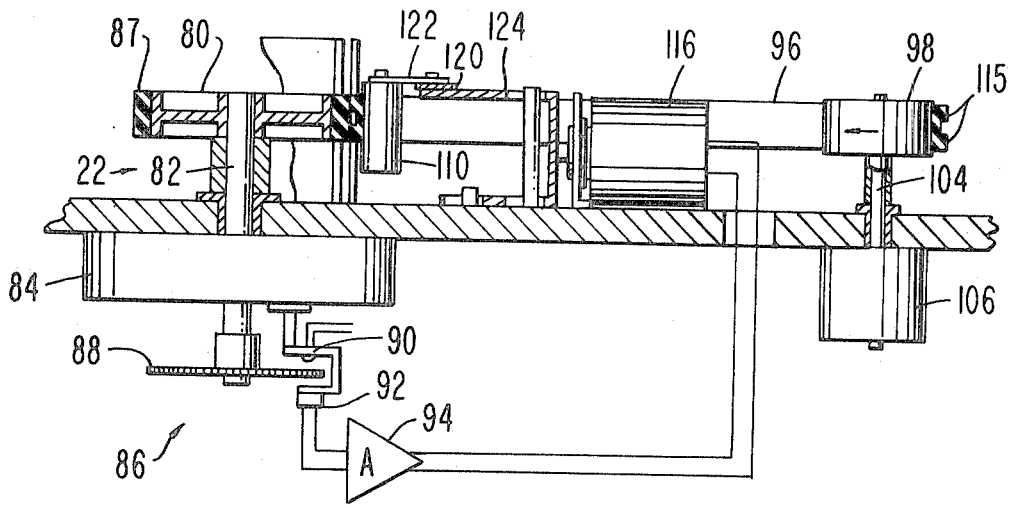
FIG. 2 is a sectional view taken along line 2—2 of FIG. 1.
Figure 3:
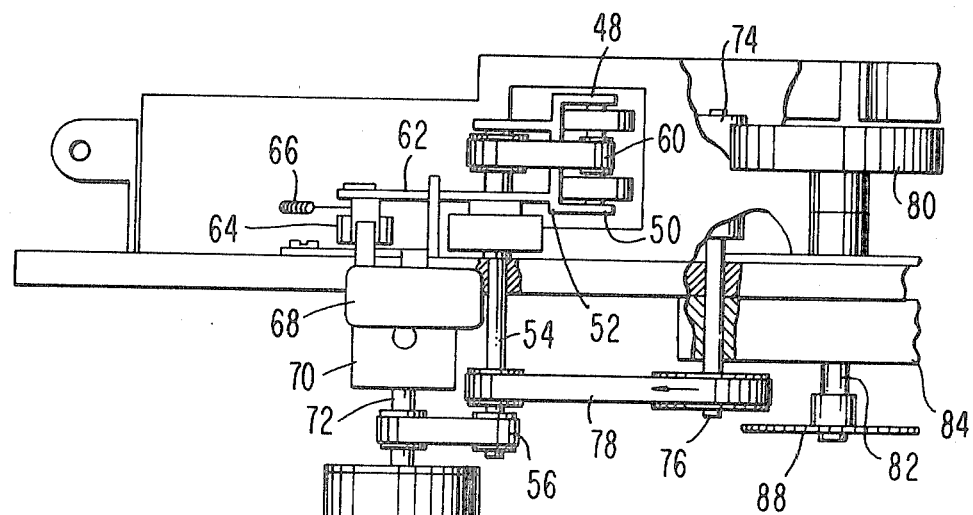
FIG. 3 is an end view of the apparatus of FIG. 1 showing the hopper feed unit.

Referring to the figures by the character of reference, there is illustrated in FIG. 1 a portion of a document transport system. A plurality of documents 10 are initially stored in a hopper 12 prior to being fed along a document guideway 14. The documents are dispensed from the hopper under the control of a hopper feed unit 16 through an inner connecting guideway 18 to a separator unit 20 and an associated document drive unit 22. The separator unit functions to remove overlapping documents such as the document 24 illustrated in FIGS. 1 and 5 from the first or front document 26 which is ultimately driven by the document drive unit into the guideway 14.

Figure 5:
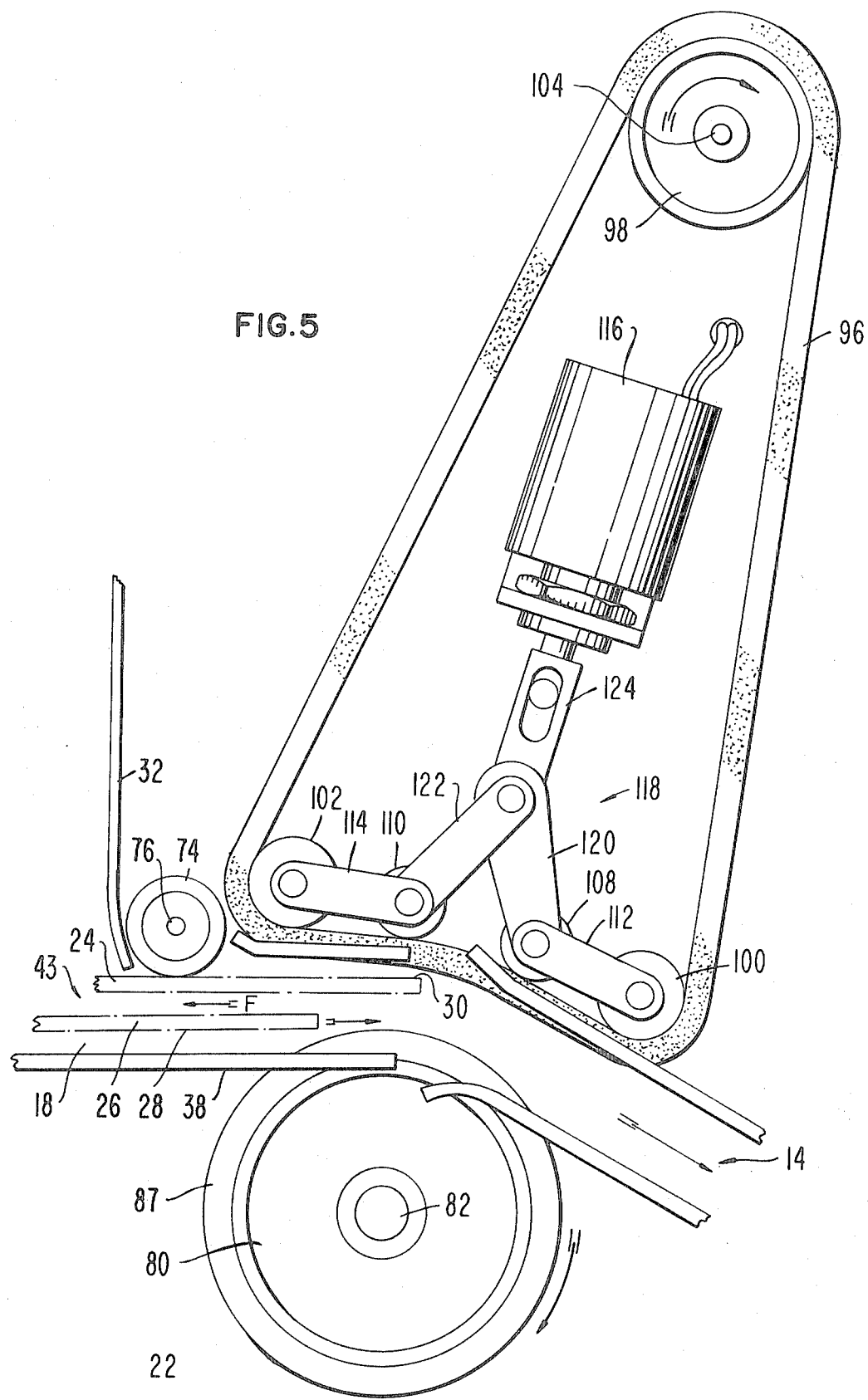
FIG. 5 is an enlarged view of the separator unit, the document drive unit and a plurality of overlapping documents.

In order to remove the overlapping document 24 from the front document 26, the frictional force $F$ between the two documents as illustrated in FIG. 5, must be less than either of the frictional forces acting on the broadside 28 of the front document by the document drive unit 22 and the force acting on the back broadside 30 of the overlapping document 24 by the separator unit 20. If the aforementioned statement remains true then the front document 26 will be driven by the document drive unit 22 into the guideway 14 and the overlapping document 24 will be prevented from being driven into the guideway 14 until the document 26 has cleared the document drive unit 22. The overlapping document 24 will then become the front document and will be driven along the guideway 14.

The hopper 12 of formed by a pair of parallel spaced-apart elongated sideplates 32 and 34 extending orthogonally from a base plate 36. A fixed front plate 38 encloses one end of the hopper and extends to form one side of an interconnecting guideway 18. The other end of the hopper is enclosed by a movable backup plate 40 which is movable under power toward the fixed front plate by a load screw 42. The junction of the sideplate 32 and the fixed front plate 38 forms an outlet 43 from which the documents 10 are dispensed into the interconnecting guideway 18. Positioned outside the hopper 12 and extending through the fixed front plate 38 is the hopper feed unit 16.

The function of the hopper feed unit is to dispense the documents from the hopper for eventual travel along the guideway 14. The documents 10 in the hopper are stacked along their edges with their front broadsides parallel to the fixed front plate 38 of the hopper. The movable backup plate 40 cooperates with the front plate 38 to keep the documents compacted against the fixed front plate 38.

The hopper feed unit comprises a pair of parallel spaced-apart feed wheels 44 which are fixedly mounted to a feed wheel shaft 46. The feed wheel shaft 46 is supported between the pair of parallel spaced-apart arms 48 and 50 of the yoke 52. The shaft 46 is pivotally mounted around and spaced from a drive shaft 54 which in turn in driven by a belt 56 from a motor 58. The feed wheels 44 are driven by the belt 60 connecting the drive shaft 54 and the feed wheel shaft 46. A lever 62 mounted for pivotal rotation around the drive shaft 54 is connected to the yoke 52 and extends away from the drive shaft 54 in a direction opposite to that of the yoke 52.

Connected to the free end of the lever 62 are a switch actuation member 64 and a constant pressure spring 66. The constant pressure spring 66 functions to bias the feed wheels 44 through the fixed front plate 38 of the hopper and onto the front broadsides 28 of the documents 10. The amount of displacement of feed wheels into the hopper is sensed by the switch 68 which when actuated electrically couples the lead screw 42 through the gear box 70 to the motor 58. When electrical power is supplied to the gear box 70 to interconnect the motor drive shaft 72 with the lead screw, movable backup plate 40 is moved in a direction toward the fixed front plate 38 to compress the stack of documents 10. As the documents are pressed forward, the hopper feed unit 16 is pivoted about the drive shaft 54 and the switch actuating member 64 is removed from the switch electrically disconnecting the gear box coupling between the lead screw 42 and the drive shaft 72 causing the leading screw to stop rotating.

Positioned in the interconnecting guideway 18 and outside of the outlet 43 of the hopper, is a constantly rotating stripper wheel 74. The stripper wheel 74 is mounted on a shaft 76 and is coupled to the motor 58 through a belt train comprising belts 78 and 56 causing the stripper wheel to rotate in the direction indicated by the arrow in FIG. 1. The cylindrical surface of the stripper wheel 74 comes in contact with the broadsides of the overlapping documents being dispensed from the hopper when there are an excessive number of documents attempting to leave the hopper to prevent the excessive number of overlapping documents from leaving the hopper and jamming the interconnecting guideway. The stripper wheel, however, will permit a number of overlapping documents to be moved through the interconnecting guideway to be further separated by the separator unit 20.

The document drive unit 22 comprises a drive wheel 80 connected to a motor drive shaft 82. The drive shaft 82 extends through a low-inertia, high-response motor 84, such as a moving coil DC printed circuit motor, and terminates with the velocity indicator unit 86. The cylindrical peripheral surface of the wheel 80 is treated to have a high coefficient of friction between the wheel and the front broadside surface 28 of the front document 26. In the preferred embodiment, this surface is coated with natural rubber in the form of a tire 87.

Figure 4:
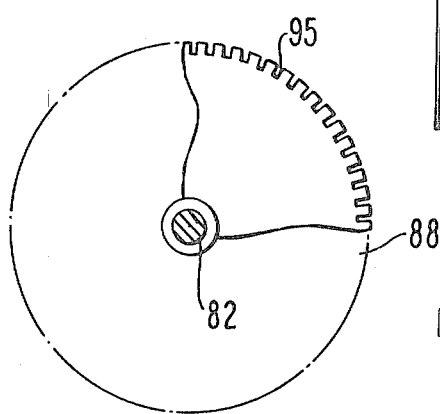
FIG. 4 is a plan view of the preferred embodiment of the velocity indicator.

The velocity indicator unit in the preferred embodiment is connected to the motor drive shaft 82 and comprises a rotating slotted disk 88 as illustrated in FIG. 4, rotatively driven between a solar cell excitor or a lamp 90 and the solar cell 92. Electrical signals generated in the solar cell 92 are electrically supplied to a current amplifier 94. As the slots 95 of the disk 88 pass between the lamp and the solar cell, the alternate light and dark conditions of the solar cell generates an electrical signal indicating the presence or absence of a slot. With the disk for rotation to the motor drive shaft 82, the frequency of the electrical signals from the solar cell 92 is proportional to the rotational velocity of the drive shaft 82.

The separator unit 20 in the preferred embodiment, as illustrated in FIG. 5, comprises a separator member or scrubber belt 96 driven by the drive pulley 98 along an enclosed path defined by a pair of guide wheels 100 and 102. The drive pulley 98 is connected by a drive shaft 104 to a low speed, high torque motor 106. The path of the belt 96 is altered by the positioning of a pair of movable guide rollers 108 and 110.

The movable guide roller 108 is pivotable about the shaft of the fixed guide wheel 100 by the link 112. The movable guide roller 110 is pivotable about the shaft of the fixed guide wheel 102 by the link 114.

The separator member, in the preferred embodiment, is a flexible urethane foam belt having two parallel spaced-apart ridges 115 extending in the direction of length of the belt. The function of these ridges is to give the belt a degree of compressibility when in contact with the documents without the attendant spread of the belt. The loading on the belt by the document is more uniform than with a solid belt. However, if the loading is minimal, then a solid cross sectional belt of urethane foam may be used. In either event, the frictional operation of the control system is not changed.

The movable guide wheels 108 and 110 are positioned in response to the operation of the linear actuator 116 acting through a Y-shaped member 118. The arms 120 and 122 are pivotally mounted at their respective guide wheel and are joined in a pivotable connection to the body portion 124 of the Y-shaped lever. The body member 124 is an extension of the armature of the linear actuator 116 and as the armature is driven out of the linear actuator, the movable guide wheels will alter the path of the belt 96. This alteration of path will both change the amount of wrap between the belt 96 and the drive wheel 80 and increase the pressure applied to the wheel. As will hereinafter be described, this operation of the linear actuator acting upon the belt 96 will maintain the frictional forces between the belt 96 and the drive wheel 80 or between the belt 96 and the overlapping document 24. The linear actuator is electrically connected and responsive to the output of the current amplifier 94. As the speed of the drive motor 84 changes, the amount of current to linear actuator changes in direct proportion to the speed change.

While in the preferred embodiment, the separator member 96 is illustrated as an elongated flexible belt, it is to be understood that the separator member could be a block or a wheel which is movable towards and away from a drive wheel. The linear actuator responding to the change in the coefficient of friction would operate to move the block or wheel in a manner substantially identical to that for the belt.

The document transport system, as illustrated in FIG. 1, is required to handle and feed documents of the various sizes and varying thicknesses. The linear actuator 116 in response to the current from the current amplifier 94 controls the operation of the scrubber belt in handling these various documents. The current amplifier supplies the proper amount of current to the linear actuator to so position the actuator to satisfy the basic frictional equation:

$$F = fN =$$

where:
- $F$ is the frictional force illustrated in FIG. 5 between overlapping documents or in the absence of documents between the scrubber belt and the document drive wheel surface;
- $f$ is the coefficient of friction which is a characteristic of the different documents and the materials of the belt at the drive wheel 80; and
- $N$ is the force applied by the linear actuator to the scrubber belt and acting in a direction which is normal to the broadsides of the document passing between the scrubber belt and the drive wheel.

As previously indicated, it is desired to hold the force, $F$, constant by varying the normal force, $N$, in response to the variations of the coefficient of friction, $f$.

The coefficient of friction, $f$, as previously indicated, varies from document to document depending upon the type of material the document is made and the surface treatment of the document. In the belt, the coefficient of friction changes along the length of the belt as a result of the manufacture of the belt. Also, the coefficient of friction of the belt changes due to wear or to contamination to the belt by ink or dirt being picked up from the document. In a similar manner, the coefficient of friction of the drive wheel 80 will also vary during the operation of the document transport unit.

In the normal operation of the document transport system, when power is applied, the motor 84 drives the drive wheel 80 at a rotational speed of approximately 350 r.p.m. This rotational velocity is equivalent to a surface speed on the surface of the wheel of approximately 60 inches per second. Thus, if the broadside of a document was placed in contact with the drive wheel, the document would move at a speed of 60 inches per second. The motor 106 drives the drive pulley 98 at a rotational speed of 1 r.p.m. This speed in turn moves the scrubber belt at a surface speed of approximately 0.16 inches per second. Since the belt bears against the back broadside 30 of a document, the net forward speed of the document is the speed of the drive wheel.

The current amplifier 94 is adjusted to supply a current through the linear actuator such that the normal force applied by the linear actuator to the belt will load the drive wheel 80 to an extent that the rotational velocity of the drive wheel is 350 r.p.m. This defines the nominal pressure applied to the belt or frictional force between the belt and the drive wheel and the amount of wrap by the belt around the drive wheel. The coefficient of friction between the belt and the drive wheel is typically higher than the coefficient between a document and the belt or the drive wheel. The position of the movable guide wheels 108 and 110 is such that the belt wraps around the drive wheel a predetermined amount applying a nominal amount of pressure. This predetermined amount of wrap is greater than the amount of wrap by a document around the drive wheel.

If, for the purposes of illustration, the belt is moved away from the drive wheel so as not to be in operative contact therewith, the rotational speed of the motor 84 will increase beyond the nominal 350 r.p.m. The disk 88 also moving at this faster speed will generate a higher frequency of electrical signals from the solar cell 92 which in turn operates on the amplifier 94 to increase the current output from the amplifier. The increased current moves the armature of the actuator 116 forward towards the wheel to apply more pressure through the belt to the wheel, acting to slow the rotational speed of the wheel down. Conversely, if the belt was being held tightly against the wheel 80 slowing the wheel down below the operational velocity of the 350 r.p.m., the amount of current to the linear actuator would be reduced, restoring the armature within the actuator and pulling the belt away from the wheel allowing the wheel to speed up.

If there is only one document being fed from the interconnecting guideway 18, the drive wheel 22 will contact this document along its front broadside 28 and it will be driven into the guideway 14 at a speed of 60 inches per second. The scrubber belt will rub against the reverse broadside of the document imparting a frictional force tending to retard or restrict the movement of the document, however, the inertia of the document gained from the operations of the feed wheels 44 coupled with the frictional force differences on the front and rear broadsides of the document overcomes the effect of the scrubber belt and the document is driven into the guideway 14.

As illustrated in FIG. 5 where there is an overlapping document 24, the frictional force $F$ between the documents which tends to move the document 24 along with the document 26 is less than the frictional force applied to the rear broadside 30 of the overlapping document by the scrubber belt. This difference between frictional forces restricts the travel of the overlapping document into the guideway 14 until the front document 26 has moved beyond the drive wheel 80.

As previously indicated over the life of the document transport unit the surface of the scrubber belt 96 and the surface of the drive wheel 80 significantly change due to wear and contamination. This change generally has the function of reducing the coefficient of friction between these two members and the documents passing therebetween.

In prior art systems when the coefficient of friction is reduced, the overlapping document will then tend to be fed as overlapping documents into the guideway 14. In the controlled pressure separator unit as hereinbefore described, as the coefficient of friction of the belt 96 and the drive wheel 80 changes, the linear actuator will respond to increase the normal force applied to the belt maintaining the frictional forces between the belt and the drive wheel. Another advantage of the system as herein described is when the power is removed from the system, the separator member and the drive wheel separate allowing either one to be replaced or changed without interference from the other.

What is claimed is:

1. In a document transport system, a control system for maintaining a uniform drive force on a separator member, said system comprising:
    a hopper for storing and dispensing a plurality of overlapping documents in a predetermined order,
    a guideway adapted to receive the overlapping documents from said hopper and guide the documents along a path of travel,
    document drive means extending into said guideway and in operative contact with a broadside surface of the front document to move that document in a first direction and at a normal speed along said guideway,
    a separator member extending into said guideway diametrically opposite to and operatively coupled with said document drive means, said separator member applying a constant frictional force to a broadside surface of a document overlying the front document tending to move the overlying document in a direction opposite to said first direction at a second speed,
    velocity indicator means operatively coupled to said document drive means and responsive to a velocity change of said document drive means to generate an electrical signal in response thereto, and
    a pressure actuator operatively connected to said separator member and responsive to the electrical signals from said velocity indicator to vary the force applied normally to the broadside surface of the overlying document by said separator member.

2. In a document transport system according to claim 1 wherein the said separator member is an endless flexible belt moving in a direction opposite to said first direction.

3. In a document transport system according to claim 2 wherein separator member is driven by a low-speed high-torque motor.

4. In a document transport system according to claim 1 wherein said velocity indicator means comprises a slotted disk rotating at a speed proportional to said document drive means and a current amplifier electrically coupled to said disk to generate a current level when said drive means is rotating at the normal speed and to increase the current level when said drive means is rotating at a greater speed and to decrease the current level when said drive means is rotating at a lesser speed.

5. In a document transport system according to claim 4 wherein said pressure actuator varies the force applied by the separator member in relationship to the current level from said current amplifier.

6. In a document transport system, a controlled pressure separator member system to prevent the transporting of overlapping documents, said pressure control system comprising:
    a guideway adapted to receive a plurality of overlapping documents for guiding the documents on edge along a path of travel,
    a drive wheel extending into said guideway and having a first portion of its periphery in operative contact with a broadside of the leading document, said drive wheel normally rotating at an angular velocity to move the document along the path of travel at a normal linear speed,
    a separator member normally in engagement with a second portion of the periphery of said drive wheel, said second portion extending to either side of said first portion, said separator member applying a substantially radial force to said drive wheel to create a normal frictional force between said member and said wheel to maintain the normal angular velocity of said wheel, and a force actuator operatively connected to said separator member and responsive to variations in the angular velocity of said wheel maintaining the normal frictional force by varying said radial force applied to said wheel by said member.

7. In a document transport system according to claim 6 wherein said separator member is a flexible endless belt moving across said second portion of said wheel in a direction opposite to the rotational direction of said wheel.

8. In a document transport system according to claim 7 wherein said endless belt is moving at a linear speed substantially slower than the angular velocity of said wheel.

9. In a document transport system according to claim 7 wherein said separator member is a flexible endless belt having at least two compressible ridges extending longitudinally along one side of said belt, said ridges adapted to be in operational contact with said second portion of said wheel in the absence of a document.

10. In a document transport system according to claim 6 wherein said force actuator is an electrical current controlled actuator wherein the control current is proportional to the radial force applied thereby to the separator member.

11. In the document transport system according to claim 6 wherein said drive wheel has a natural rubber peripheral surface to provide a predetermined coefficient between said drive wheel and said separator member.

* * * * *